United States Patent [19]

Shen et al.

[11] 4,314,980

[45] Feb. 9, 1982

[54] PREPARATION OF REACTIVE BETA-DICALCIUM SILICATE

[75] Inventors: Ming-Shing Shen, Laramie, WY; James M. Chen, Rahway, N.J.; Ralph T. Yang, Amherst, N.Y.

[73] Assignee: The United States of America as represented by the United States Department of Energy, Washington, D.C.

[21] Appl. No.: 125,406

[22] Filed: Feb. 28, 1980

[51] Int. Cl.$^3$ ............................................. C01B 33/24
[52] U.S. Cl. ..................................... 423/331; 423/244
[58] Field of Search ................. 423/331, 244; 106/103, 106/306

[56] References Cited

U.S. PATENT DOCUMENTS 2,263,606 11/1941 Balassa ................................. 106/306
2,863,726 12/1958 Kamlet .................................. 106/103
3,717,489 2/1973 Herzog et al. ........................ 106/103

OTHER PUBLICATIONS

Shen et al. "Regenerative Process for Desulfurization of High Temperature Combustion and Fuel Gases", BNL 50992, May 1979, p. 22.

Roy et al. "J. American Ceramic Society", vol. 60, No. 3-4, 1977, pp. 178-180.

Heller et al. "J. Chem. Soc.", London (1952) pp. 2535-2541.

*Primary Examiner*—Edward J. Meros
*Attorney, Agent, or Firm*—Cornell D. Cornish; Richard G. Besha

[57] ABSTRACT

This invention relates to the preparation of fine particles of reactive beta-dicalcium silicate by means of a solid state process which comprises firing a mixture of calcium sulfate, silica and a reducing additive selected from the group consisting of calcium sulfide, carbon, carbon monoxide, methane and hydrogen, at a temperature of about 850°-1000° C. A carrier gas such as nitrogen or carbon dioxide may also be added, if desired. A high concentration of sulfur dioxide is a by-product of this process.

7 Claims, No Drawings

PREPARATION OF REACTIVE BETA-DICALCIUM SILICATE

The United States Government has rights in this invention pursuant to Contract No. EY-76-C-02-0016, between the U.S. Department of Energy and Associated Universities, Inc.

BACKGROUND OF THE INVENTION

This invention relates to a method of producing beta-dicalcium silicate and more particularly to a method for producing fine particles which are reactive and suitable for use as a sorbent for desulfurization.

Beta-dicalcium silicate has been found to possess particular utility as sorbents because of their high resistance to attrition, high reactivity to $SO_2$, high regeneration rate which permits lower temperature processing, and high reactivity of the regenerated sorbent. This high sulfation reactivity has rendered beta-dicalcium silicate particularly useful in industry in the desulfurization of high temperature combustion and fuel gases.

However, in the methods heretofore utilized for the preparation of beta-dicalcium silicate, which includes evaporative decomposition of solutions of calcium nitrate and colloidal silica at 1050° C., or repetitive firing of a mixture of fine powders of calcium carbonate and silica at 1080° C., the temperature is high and, therefore, the reactivity of the recovered beta-dicalcium silicate is rather low.

The preparation of calcium meta-silicates, calcium mesodisilicates and calcium silicate hydrates is generally known in the prior art.

For example, U.S. Pat. No. 3,264,130 to Mays discloses the process of reacting aqueous slurries of divalent basic metal oxides or hydroxides which include calcium oxide or hydroxide, with reactive silica in the molar ratio of 1 mole metal oxide per 4 moles silica, at elevated temperatures of about 100° C. for a time sufficient to complete the reaction and recovering finely divided powdered calcium silicate pigment wherein 1 mole CaO combined with 1 mole $SiO_2(CaO.SiO_2)$ or with 2 moles $SiO_2(CaO.2SiO_2)$ as specifically described in Examples XIV and XV.

U.S. Pat. No. 3,988,419 to Mori discloses a process of producing calcium silicate insulation which comprises reacting an aqueous slurry of amorphous silica with lime at elevated temperatures of about 90° C. to form a gel, kneading said gel under saturated steam pressure to convert to a viscoelastic material and subsequently treating said material with superheated steam to form xonotlite crystals of calcium silicate, which has the formula $5CaO.5SiO_2.H_2O$ (Hackh's Chem. Dictionary, Third Edition, page 916).

U.S. Patent No. 3,131,024 to Leineweber discloses a process of preparing dicalcium silicate alpha hydrate useful as a flatting agent for clear lacquers by means of the hydrothermal reaction, at a temperature above 180° C. (i.e., 232° C.), of a slurry of calcium hydroxide and silica in the presence of a small amount of sodium hydroxide or fluoride. This process is disclosed as being superior to the prior art process of hydrolyzing beta calcium silicate at a temperature of 140° to 200° C., in the production of good yields of the alpha hydrate.

The Ohnemuller U.S. Pat. Nos. 3,861,935 and 3,967,974 disclose the process of preparing synthetic crystalline beta-wollastonite, which is calcium meta silicate ($CaSiO_3$), by reacting an aqueous mixture of lime hydrate and silicic acid or silica, at a temperature of 100° to 500° C., in the presence of mineralizers (soluble alkali and alkaline earth metal salts) to form calcium silicate hydrates, and then annealing the hydrates at a temperature of 800° to 1150° C. to convert them to pure crystalline beta-wollastonite, the calcium silicate hydrate formed as the intermediate product prior to annealing being tobermorite or xonotlite.

U.S. Pat. No. 3,552,915 to Rostoker discloses a process making porous bodies of fibrous beta-wollastonite, which is a naturally occurring fibrous form of calcium meta-silicate, by sintering preformed bodies of beta-wollastonite at a temperature of 1150° C., which is near but below the temperature at which beta-wollastonite undergoes a phase transformation to the alpha-wollastonite.

Although the prior art discloses the preparation of calcium meta-silicates, beta-wollastonite, wollastonite hydrates and dicalcium silicate alpha-hydrate, by reacting an aqueous slurry of lime or calcium hydroxide and silica at elevated temperatures of about 90° to 500° C.; there is no disclosure of the production of reactive beta-dicalcium silicate by a low temperature solid state process of firing a mixture of calcium sulfate and silica together with a reducing agent such as calcium sulfide or a member selected from the group consisting of C, CO, $CH_4$ and $H_2$ which reduces calcium sulfate to calcium sulfide.

It has now been found that in the present process, temperature can be as low as 850° C. and up to 1000° C., which results in substantial energy savings and yields more reactive products. In addition, the calcium sulfate reactant is more stable than the calcium reactants heretofore utilized. The beta-dicalcium silicate produced by the present process will possess superior sulfation reactivity, higher sorption reactivities and be highly regenerable from its sulfated compounds for reuse as a sorbent, as well as be more resistant to attrition.

SUMMARY OF THE INVENTION

Accordingly, it is a primary object of the instant invention to provide a low temperature solid state process of forming fine particles of reactive beta-dicalcium silicate.

Another object of the instant invention is to provide a process for producing beta-dicalcium silicate of increased reactivity to $SO_2$.

Still another of the instant invention provides for the use of readily available materials as the source of calcium oxide in the production of the beta-dicalcium silicate.

Additional objects, novel features and advantages of the present invention will be apparent to those skilled in the art from the following description.

The present invention achieves the above objects and overcomes the disadvantages of the prior art by means of a process of producing reactive beta-dicalcium silicate which comprises reacting a mixture of calcium sulfate and silica in the presence of a reducing agent selected from the group consisting of calcium sulfide, carbon, carbon monoxide, methane and hydrogen, at a temperature of about 850° C. to 1000° C., for a sufficient period of time to produce beta-dicalcium silicate.

More specifically, the present process of producing reactive beta-dicalcium silicate comprises preparing a stoichiometric mixture of calcium sulfate, silica and reducing agent selected from the group consisting of CaS, C, CO, $CH_4$ and $H_2$, and subjecting said mixture to a firing temperature of about 850° C. to 1000° C., in the presence of a carrier gas such as nitrogen or carbon dioxide, and recovering fine particles of reactive beta-dicalcium silicate. When using CaS as the reductant, a mole ratio of $3CaSO_4:CaS:2SiO_2$ constitutes the stoichiometric mixture. However, CaS can be formed by the reduction of $CaSO_4$ with any of the other reducing agents in order to effect the stoichiometric molar ratio of reactants defined above.

DESCRIPTION OF THE INVENTION

The reactive beta-dicalcium silicate according to the present invention is produced by the method which generally comprises preparing a mixture of fine powder of calcium sulfate, silica and a reducing agent selected from the group consisting of calcium sulfide, carbon, carbon monoxide, methane and hydrogen, in the molar ratio of $3CaSO_4:CaS:2SiO_2$; subjecting said mixture to a thermal treatment in the range of about 850°–1000° C. for a period of time sufficient to effect reaction and the formation of fine particles of reactive beta-dicalcium silicate.

The presence of the reducing agent in the reaction mixture allows the reaction temperature to be kept below 1000° C. and preferably at 900° C.

Calcium sulfide may be added directly to the reaction mixture of calcium sulfate and silica, or can be formed in situ by the reduction of a portion of the calcium sulfate ingredient with a reducing agent selected from the group consisting of carbon, carbon monoxide, methane and hydrogen, in accordance with the following equations:

1. $CaSO_4 + 2C \rightarrow CaS + 2CO_2$

2. $CaSO_4 + 4CO \rightarrow CaS + 4CO_2$

3. $CaSO_4 + 4H_2 \rightarrow CaS + 4H_2O$

4. $CaSO_4 + CH_4 \rightarrow CaS + 2H_2O + CO_2$

The calcium sulfate reactant, preferably in the form of a fine powder, may be calcium anhydrite or gypsum, which is hydrated calcium sulfate, i.e., $CaSO_4.2H_2O$.

The silica reactant, likewise, is preferably in the form of a fine powder such as silica sand, quartz, or other suitable finely divided silica-containing material.

Stoichiometric amounts of solid reactants, calcium sulfate and silica and a reducing additive are preferably premixed in a mixer, to which a carrier gas such as nitrogen or carbon dioxide may optionally be added. This mixture, which is preferably in the form of a fine powder, is fed to a reactor, such as a furnace, and heated to about 850°–1000° C. until the reaction is complete, preferably for a period of about two hours. Maintaining a maximum temperature of 1000° C. provides for a product of increased sulfation activity, high resistance to attrition and high regeneration rates as well as high reactivity of the regenerated sorbent, beta-dicalcium silicate. Temperatures greater than 1000° C., produce products of decreased sulfation activity and decreased resistance to attrition. This reaction, as shown below, produces concentrated $SO_2$ as a by-product.

5. $3CaSO_4 + CaS + 2SiO_2 \rightarrow 2Ca_2SiO_4 + 4SO_2$

The product recovered from this reaction is in the form of a fine powder and is identified as beta-dicalcium silicate by x-ray diffraction analysis.

The following examples are merely illustrative of the instant invention, but it is not intended to be limited thereto.

EXAMPLE I

A stoichiometric mixture of fine powder of 516 mg gypsum, 72 mg calcium sulfide and 120 mg silica was made. This mixture was heated at 900° C. in a furnace for about two hours. X-ray diffraction analysis showed that the product contains 70–80% beta-dicalcium silicate.

EXAMPLE II [HYPOTHETICAL]

8.1 grams gypsum is mixed with 0.3 grams coconut charcoal and 1.5 grams silica, and the mixture heated in an atmosphere of nitrogen at 900° C. in a furnace for about two hours.

2.0 grams gypsum is first reduced by 0.3 grams coconut charcoal to form 0.85 grams calcium sulfide in situ, and the remaining 6.1 grams gypsum reacts with said 0.85 grams calcium sulfide and 1.5 grams silica to form the beta-dicalcium silicate.

Although the specific examples utilize gypsum as the calcium reactant because of its ready availability, calcium sulfate anhydrite may be substituted therefor.

Similarly, in lieu of the coconut charcoal reductant to form the calcium sulfide in situ, there may be substituted the gases carbon monoxide, methane or hydrogen. It is also noted that the carrier gas carbon dioxide, which may be substituted for the nitrogen gas, is formed in situ simultaneously with the in situ formation of calcium sulfide when utilizing the reducing agents carbon, carbon monoxide or methane. Thus, it is apparent that variations in the process may be made depending on the availability of reactants.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

What is claimed is:

1. A method of producing beta-dicalcium silicate in the form of fine particles which exhibit high reactivity to sulfur dioxide and which are suitable for use in desulfurization processes which comprises preparing a stiochiometric mixture of finely powdered calcium sulfate, silica, and a reducing agent selected from the group consisting of calcium sulfide, carbon, carbon monoxide, methane and hydrogen, adding to said mixture a carrier gas selected from the group consisting of nitrogen and carbon dioxide, and subjecting the resulting mixture to thermal treatment at approximately 900° C.

2. A method in accordance with claim 1, wherein calcium sulfide is the reducing agent and the mole ratio of reactants is $3CaSO_4:1CaS:2SiO_2$.

3. A method in accordance with claim 2, wherein the calcium sulfide is formed in situ during the thermal treatment by the reduction of a portion of the calcium sulfate with a reducing agent selected from the group consisting of carbon, carbon monoxide, methane and hydrogen.

4. A method in accordance with claim 1, wherein the carrier gas is nitrogen.

5. A method in accordance with claim 1, wherein the carrier gas is carbon dioxide formed in situ simultaneously with the in situ formation of calcium sulfide during the thermal treatment in the presence of a reducing agent selected from the group consisting of carbon, carbon monoxide and methane.

6. A method in accordance with claim 1, wherein the calcium sulfate is gypsum.

7. A method in accordance with claim 1, wherein the calcium sulfate is calcium sulfate anhydrite.

* * * * *